United States Patent
Whalen et al.

(10) Patent No.: US 9,540,021 B2
(45) Date of Patent: Jan. 10, 2017

(54) SLACK ADJUSTER CONTAMINANT MITIGATION DEVICE

(71) Applicant: WABTEC Holding Corp., Wilmerding, PA (US)

(72) Inventors: Shaun T. Whalen, Chicago, IL (US); Peter Paul Gregar, Chesterton, IN (US); Scott Lee Natschke, Bourbonnais, IL (US); Wajih Kanjo, Homer Glen, IL (US); Michael Koziol, Berwyn, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 51 days.

(21) Appl. No.: 14/315,502

(22) Filed: Jun. 26, 2014

(65) Prior Publication Data

US 2015/0001016 A1   Jan. 1, 2015

Related U.S. Application Data

(60) Provisional application No. 61/841,554, filed on Jul. 1, 2013.

(51) Int. Cl.
*B61H 15/00* (2006.01)
*F16D 65/66* (2006.01)
*F16D 65/00* (2006.01)

(52) U.S. Cl.
CPC ....... *B61H 15/0057* (2013.01); *F16D 65/0025* (2013.01); *F16D 65/66* (2013.01)

(58) Field of Classification Search
CPC .. F16D 65/0025; F16D 65/66; B61H 15/0028; B61H 15/0057

(Continued)

(56) References Cited

U.S. PATENT DOCUMENTS 3,520,387 A * 7/1970 Natschke ........... B61H 15/0057
188/196 D
3,595,347 A * 7/1971 Billeter .............. B61H 15/0057
188/202

(Continued)

FOREIGN PATENT DOCUMENTS

WO   2012174505 A1   12/2012

OTHER PUBLICATIONS

Reclamation Manual for Ellcon National Model D-2000 Series Slack Adjuster, Nov. 20, 2008, 19 pages.

(Continued)

*Primary Examiner* — Thomas J Williams
*Assistant Examiner* — San Aung
(74) *Attorney, Agent, or Firm* — The Webb Law Firm (57) ABSTRACT

A contaminant mitigation device for use with a slack adjuster for a railway brake rigging to protect the critical operating area of the slack adjuster. The critical operating area of a slack adjuster includes the components that are configured to operate together to adjust the brake rigging. The slack adjuster includes at least a main housing portion, a cone nut housing portion enclosing the critical operating area of the slack adjuster, and an overtravel housing portion. The contaminant mitigation device includes a sealing system configured for cooperating with at least one of the main housing portion, cone nut housing portion, and overtravel housing portion to seal the critical operating area against entrance of fluid and/or contaminants therein and/or to at least reduce the exposure of this area to fluid and/or contaminants. The contaminant mitigation device can also include a drainage system associated therewith.

24 Claims, 7 Drawing Sheets

(58) Field of Classification Search
USPC .............. 188/202, 203, 200, 197, 196 R, 196 D, 188/196 B, 196 V, 198; 277/500, 311, 503, 412
See application file for complete search history.

(56) References Cited

U.S. PATENT DOCUMENTS

| | | | | |
|---|---|---|---|---|
| 4,662,485 | A * | 5/1987 | Kanjo | F16D 65/66 188/196 D |
| 4,683,991 | A * | 8/1987 | Kanjo | B61H 15/00 188/197 |
| 4,796,731 | A * | 1/1989 | Schmitt | F16D 65/56 188/196 D |
| 5,025,900 | A * | 6/1991 | Severinsson | F16J 15/441 188/198 |
| 5,423,401 | A | 6/1995 | Noah et al. | |
| 5,476,269 | A | 12/1995 | Karlsson | |
| 5,615,755 | A | 4/1997 | Karlsson | |
| 5,975,254 | A * | 11/1999 | Emilsson | B61H 15/00 188/196 R |
| 7,802,662 | B2 | 9/2010 | Sommerfeld et al. | |
| 9,272,718 | B2 | 3/2016 | Huber, Jr. et al. | |
| 2005/0126867 | A1 | 6/2005 | Crume et al. | |
| 2008/0088070 | A1 * | 4/2008 | Mori | F16F 9/585 267/140.12 |
| 2009/0065312 | A1 * | 3/2009 | Sommerfeld | B61H 13/24 188/202 |
| 2010/0320044 | A1 * | 12/2010 | Emilsson | F16D 65/56 188/202 |
| 2012/0068454 | A1 * | 3/2012 | Hamaguchi | F16L 25/0045 285/93 |
| 2015/0233435 | A1 | 8/2015 | Huber, Jr. et al. | |

OTHER PUBLICATIONS

New York Air Brake Technical Guide for the Product User KDR-482-E Slack Adjuster, Jul. 2010, 2 pages.
Cardwell Westinghouse Model Sheet for Universal Slack Adjusters Model 2300-DJ, C1000, Model 5, Model 5D, Model 85, Oct. 11, 2011, 3 pages.

* cited by examiner

FIG. 6B

SLACK ADJUSTER CONTAMINANT MITIGATION DEVICE

CROSS REFERENCE TO RELATED APPLICATIONS

This application is based upon U.S. Provisional Patent Application Ser. No. 61/841,554 entitled "Slack Adjuster Contaminant Mitigation Device", filed Jul. 1, 2013, which is hereby incorporated by reference in its entirety.

BACKGROUND OF THE INVENTION

Field of the Invention

The present disclosure is directed to a slack adjuster which automatically adjusts the slack in the brake rigging of a railway vehicle, and further, to a slack adjuster including a secondary interior sealing arrangement to prevent fluid, such as water, and contaminants from entering into and accumulating in the critical operating area of the slack adjuster which could interfere with the operation of the slack adjuster.

Description of Related Art

Slack adjuster assemblies have been employed in brake riggings to compensate for slack caused by wear induced in the brake pads, wheels, and other components in brake rigging during repeated braking applications. By controlling this slack, the brake piston travel is automatically maintained at the correct length to ensure maximum efficiency in the brake system. The slack adjuster is also used to automatically adjust the slack in the brake rigging for various other reasons. One reason is to maintain the brake cylinder piston rod travel distance within a prescribed limit, which is of particular importance in present day higher speed operations. In addition, today's trains have a greater number of cars due to better locomotive equipment. For these reasons, it is important that the piston rod travel of the brake cylinder be maintained at a relatively close tolerance in order to properly balance the fluid pressure, usually air, in the fluid cylinder with that in the reservoir. Another important reason is that the slack adjusters will provide a substantially more uniform braking force to be applied to each set of wheels on each car making up a train.

One example of a slack adjuster that is used in a wide variety of railway applications is a double-acting compression-type slack adjuster, which is described in U.S. Pat. No. 4,662,485 and incorporated herein by reference. This slack adjuster assembly includes an elongated hollow housing member restrained against rotation and pivotally connectable at a first end thereof to a brake rigging. An elongated rod member, which is restrained against rotation and pivotally connectable at a first end thereof to the brake rigging, is provided within this housing and has at least a threaded portion adjacent a second end thereof. The threaded portion of the rod member extends into and is reciprocally movable within the housing through a second end of the housing. A positioning means, such as a cone lock nut located within a cone nut housing portion, movable between respective first abutting engagement, disengagement, and second abutting engagement positions, is threadably engaged with the threaded portion of the rod member intermediate said ends thereof. The cone lock nut rotates about the threaded portion of the rod member when in the disengaged position thereby changing the length of the slack adjuster assembly by changing the relative longitudinal position between the housing and the rod member. A pair of opposite facing abutment surfaces positioned within a portion of the housing and a pair of opposed abutting surfaces carried by the cone lock nut for engaging respective adjacent surfaces to resist rotation of the cone lock nut about the rod member when the cone lock nut is in one of the respective abutting engagement positions thereby retarding the change in relative longitudinal position between the housing and the rod member are provided. A first urging means is positioned between the cone lock nut and an abutment surface carried by the rod member for urging the cone lock nut into the disengaged position. A second urging means is positioned between the first end of the housing and the cone lock nut for overcoming a force applied by the first urging means and for urging the cone lock nut into the first abutting relationship position. An overtravel control means located within an overtravel control housing is positioned to reciprocally move in a longitudinal direction adjacent the first end of the housing and is engageable with the second urging means for reducing the force applied by the second urging means to less than the force applied by the first urging means, thereby allowing the cone lock nut to move to the disengaged position. An overtravel control actuating means is positioned to engage the overtravel control means for actuating the overtravel control means in response to the travel distance of a brake cylinder piston connected to the brake rigging.

Other examples of slack adjusters include the Universal Model 2300-DJ, owned by the assignee of the present application, Ellcon National Model D-2000, and New York Air Brake Model KDR-482-E.

During use of the brake rigging the slack adjuster is exposed to various environmental conditions, including conditions where the slack adjuster is exposed to large amounts of fluid, such as water. This water and other contaminants from the environment can accumulate and become trapped within the critical operating area and near critical components of the slack adjuster, which can compromise the functioning of the slack adjuster. The exposure to water can be problematic especially when the outdoor temperature reaches the freezing point and water located on or within the critical operating components freeze up. In one example, such as in the Universal Model 2300-DJ, the critical operating area includes the cone nut, bearing race assembly, and the conical spring, all of which operate together to allow the slack adjuster to adjust the brake rigging of the railcars as needed. It can be appreciated that different slack adjuster designs may include additional and/or other components within the critical operating area.

Some slack adjuster designs include a wiper seal located within the overtravel control housing with the intended purpose of preventing all water from entering into the slack adjuster. However, when a slack adjuster is exposed to large amounts of water, this wiper seal can fail to block all of the water from entering into the critical operating area of the slack adjuster. Thus, in these instances, water and contaminates may enter into the critical operating area and deleteriously effect the components located therein, resulting in faulty operation of the slack adjuster. Accordingly, there is a need in the art to secure and seal the critical operating area to maintain optimal operation of the critical operating components of the slack adjuster by preventing accumulation of water and contaminants near the critical areas of the slack adjuster. The system for preventing this accumulation of water and protecting the critical operating area from contaminants must be adaptable to all slack adjusters and orientations of installation, such that the slack adjuster can be used in a wide array of environmental conditions.

SUMMARY OF THE INVENTION

In accordance with one embodiment, a contaminant mitigation device is provided for use with a slack adjuster for a railway brake rigging to protect the critical operating area of the slack adjuster. The critical operating area of a slack adjuster includes the components that are configured to operate together to adjust the brake rigging. A slack adjuster typically includes a main housing portion, a cone nut housing portion enclosing the critical operating area of the slack adjuster, and an overtravel housing portion. The contaminant mitigation device includes a sealing system configured for cooperating with at least one of the main housing portion, cone nut housing portion, and overtravel housing portion to seal the critical operating area against entrance of fluid and/or contaminants therein or to at least reduce the exposure of this area to fluid and/or contaminants.

According to one design, the critical operating area can include the cone nut, at least one bearing race assembly, and a conical spring which are configured to cooperate together to change a length of the slack adjuster by changing a relative longitudinal position between the main housing portion and a rod member located within the main housing portion. The cone nut housing portion is positioned between the overtravel housing portion and the main housing portion. The cone nut housing portion can include a first end positioned adjacent to the overtravel housing portion and a second end positioned adjacent to the main housing portion and the sealing system includes a sealing member configured for cooperating with at least one of the first and second ends of the cone nut housing portion.

According to one embodiment, the sealing member can be an O-ring and/or a sealing material associated with the first end of the cone nut housing portion. The slack adjuster can include a rod guide having threads configured for cooperating with threads located at the first end of the cone nut housing portion and the sealing member forms an interactive seal between the threads of the rod guide and the threads of the cone nut housing portion preventing fluid and/or contaminants from entering the cone nut housing portion through the cooperating threads.

The slack adjuster can also include a rod guide and at least one trigger pin located within an aperture in the rod guide wherein at least a portion of the rod guide and the trigger pin are associated with the first end of the cone nut housing portion. According to another design, the sealing system can include at least one O-ring associated with the at least one trigger pin to prevent fluid and/or contaminants from entering the cone nut housing portion through the aperture in the rod guide.

According to still another design, the sealing member can be at least one of an O-ring and/or a sealing material associated with the second end of the cone nut housing portion. The slack adjuster can include a conical spring and a conical spring seat associated with the second end of the cone nut housing portion. In this design, the sealing member cooperates with the conical spring and/or the conical spring seat such that during assembly of the main housing portion to the cone nut housing portion, the sealing material becomes compressed to seal the second end of the cone nut housing portion against the entrance of fluid and/or contaminants. According to one embodiment, the conical spring seat can be a rubberized washer that functions as the sealing member.

It can be appreciated that any or all of the sealing members discussed above can be used separately or cumulatively in any combination as needed to protect the critical operating area of the slack adjuster. Accordingly, in accordance with another embodiment, the cone nut housing portion is positioned between the overtravel housing portion and the main housing portion and the cone nut housing portion includes a first end positioned adjacent to the overtravel housing portion and a second end positioned adjacent to the main housing portion and the sealing system is configured to reduce and/or prevent the critical operating area of the slack adjuster from contacting fluids and/or contaminants. The sealing system can include at least one or more of a sealing member positioned between a threaded engagement between a rod guide and the first end of the cone nut housing portion, at least one sealing member associated with each of a trigger pin positioned within the rod guide, and/or a sealing member associated with a conical spring or conical spring seat member located at the second end of the cone nut housing portion. The sealing system can include sealing members located at a first end and a second end of the cone nut housing portion and the sealing members can be any of gaskets, O-rings, rubber sealant material, adhesive sealing compound, and the like.

The overtravel housing can include a drainage system for draining any fluid and/or contaminants that accumulate within the overtravel housing. The overtravel housing can include multiple components or can be a one-piece member. The drainage system can include at least one aperture extending through a sidewall portion of the overtravel housing. The aperture can include at least one of a removable plug, such as a low-profile button-shaped plug, a one-way valve, and a removable patch for plugging or covering the aperture. At least the plug and the patch are configured for removal from the aperture to enable drainage of the fluids and/or contaminants from the overtravel housing.

One example of a slack adjuster that can include the contaminant mitigation device is a double-acting tension actuatable slack adjuster. The double-acting slack adjuster includes an elongated hollow cylindrical housing member which is restrained against rotation and pivotally connectable at a first end thereof. The elongated hollow cylindrical housing includes a main housing portion, a cone nut housing portion, and a overtravel housing portion. The slack adjuster also includes an elongated rod member which is restrained against rotation and pivotally connectable at a first end thereof. At least a portion of the rod member is threaded and this threaded portion extends into the housing member through a second end of the housing member. The slack adjuster further includes a cone lock nut located within the cone nut housing portion and threadedly engaged with the threaded portion of the rod member intermediate a first and second end thereof. This cone lock nut is axially movable for rotating about the threaded portion of the rod member to change the length of the slack adjuster assembly by changing the relative longitudinal position between the housing member and the rod member. At least a first spring is provided for urging the cone lock nut into a first position with respect to the housing member and a second spring is provided in the overtravel housing portion for overcoming a force applied by the first spring and for urging the cone lock nut into a second position. The sealing system is configured for cooperating with at least one of the main housing portion, cone nut housing portion, and overtravel housing portion to seal the cone nut housing portion against entrance of fluid and/or contaminants therein to prevent this fluid and/or contaminants from interfering with the operation of the components in the critical operating area of the slack adjuster.

The sealing system can include at least one of a sealing member positioned between a threaded engagement between the rod guide and the first end of the cone nut housing portion; at least one sealing member associated with each of a trigger pin positioned within the rod guide; and/or a sealing member associated with a conical spring or conical spring seat member located at the second end of the cone nut housing portion. The slack adjuster can also include a drainage system configured for cooperation with said elongated hollow cylindrical housing.

In accordance with another embodiment, a slack adjuster for a railway brake rigging includes a main housing portion, a cone nut housing portion enclosing a critical operating area of the slack adjuster, and an overtravel housing portion. The cone nut housing portion can be positioned between the overtravel housing portion and the main housing portion. The cone nut housing portion can include a first end positioned adjacent to the overtravel housing portion and a second end positioned adjacent to the main housing portion. The slack adjuster also includes a sealing system configured for reducing or preventing the critical operating area from contact with fluids and/or contaminants. The sealing system includes at least one of a sealing member positioned between a threaded engagement between the rod guide and the first end of the cone nut housing portion, at least one sealing member associated with each of a trigger pin positioned within the rod guide, and/or a sealing member associated with a conical spring or conical spring seat member located at the second end of the cone nut housing portion.

The slack adjuster can also include a drainage system configured for cooperation with at least one of the main housing portion, cone nut housing portion, and overtravel housing portion.

In accordance with yet another embodiment, a method is provided for sealing a critical operating area of a slack adjuster for a railway vehicle for a railway brake rigging wherein the slack adjuster includes a main housing portion, a cone nut housing portion enclosing the critical operating area of the slack adjuster, and an overtravel housing portion. The method includes providing a sealing system configured to cooperate with at least one of the main housing portion, the cone nut housing portion, and the overtravel housing portion to seal the critical operating area against entrance of fluid and/or contaminants therein or to at least reduce the exposure of this area to fluid and/or contaminants.

The method of providing the sealing system can include at least one of positioning a sealing member between a threaded engagement between the rod guide and the first end of the cone nut housing portion, associating at least one sealing member with each of a trigger pin positioned within the rod guide, and/or associating a sealing member with a conical spring or conical spring seat member located at the second end of the cone nut housing portion. The method can also include providing at least one aperture through a sidewall portion of the overtravel housing portion to enable drainage of fluid and/or contaminants. A removable plug, such as a low-profile button-shaped plug, one-way valve, or a removable patch can be provided in or on the at least one aperture.

DETAILED DESCRIPTION OF THE INVENTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 1:
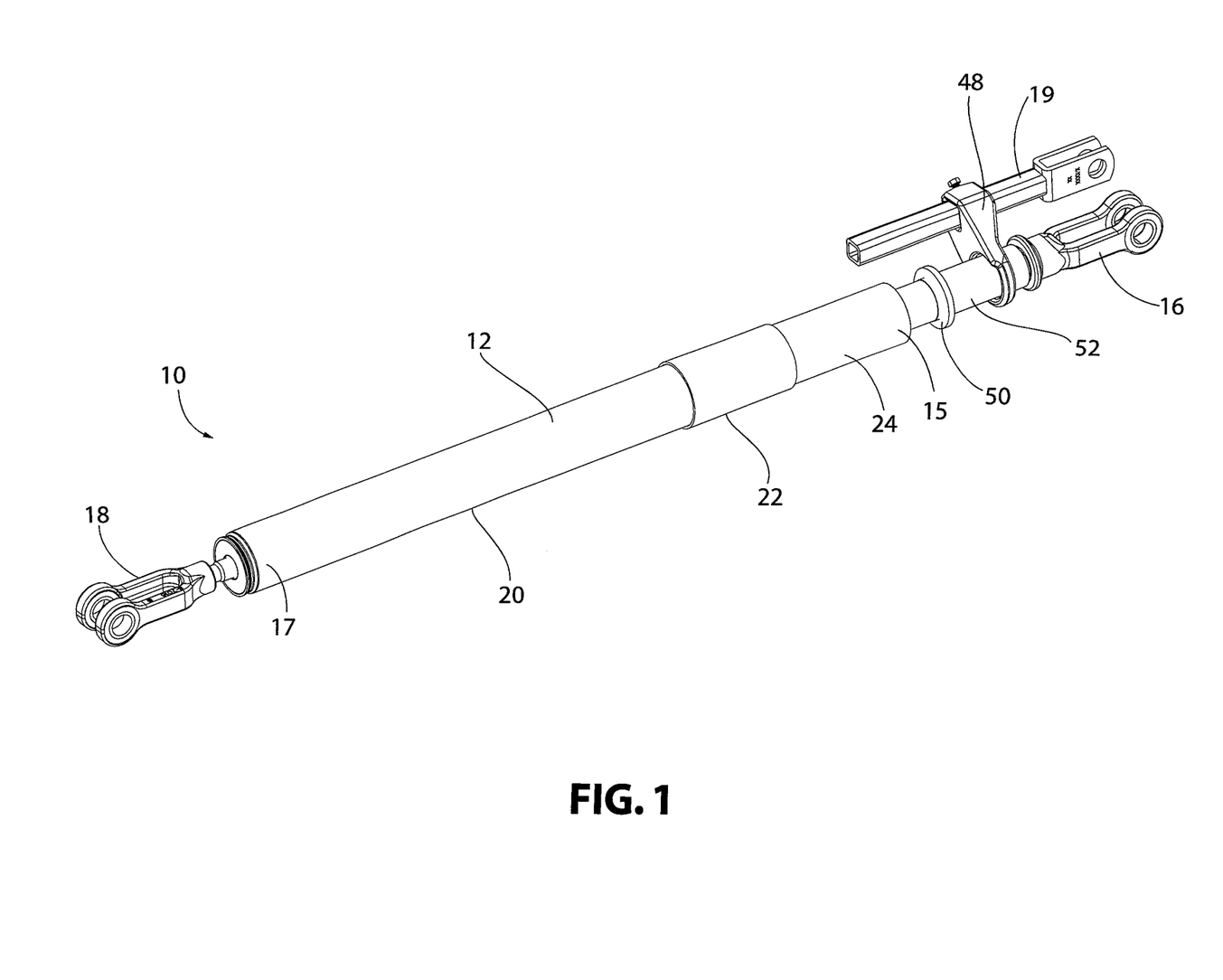
FIG. 1 is a perspective view of a double acting automatic slack adjuster for use with a brake rigging for which a contaminant mitigation device can be used in accordance with one embodiment.
Figure 2:
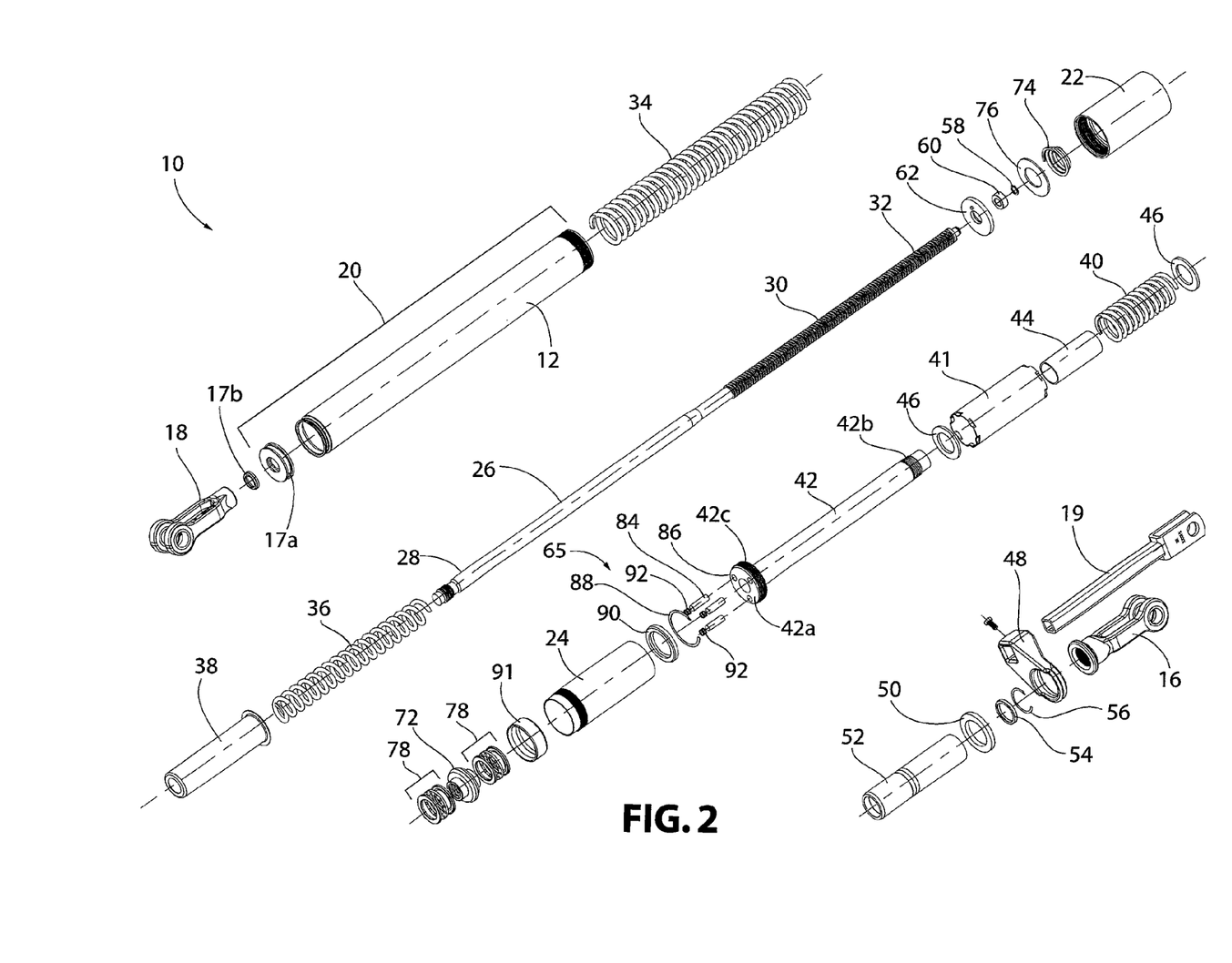
FIG. 2 is an expanded perspective view of the slack adjuster of FIG. 1, including the contaminant mitigation device.

Reference is now made to FIGS. 1 and 2 which show a double-acting slack adjuster, generally indicated as 10, for use in a railway vehicle brake linkage, not shown, to automatically adjust the slack within the brake linkage caused by wear induced in the brake pads, wheels, and other components in the brake rigging during repeated braking applications. The slack adjuster includes a contaminant mitigation system, generally indicated as 65 in FIGS. 2, 4, and 5, configured for preventing and/or reducing the amount of fluid and/or contaminants coming into contact with the slack adjuster critical operating area, generally indicated as 70 in FIGS. 3A and 3B. The slack adjuster critical operating area 70 is defined in detail below, but generally refers to the area including the components which operate together to adjust the brake rigging of the railcars as needed.

Referring back to FIGS. 1-2, the slack adjuster 10 includes an elongated hollow cylindrical housing member 12 which is restrained against rotation and pivotally connectable at a first end 15 thereof to the brake rigging with a front jaw 16 and pivotally connectable at a second end 17 thereof to the brake rigging with a rear jaw 18. The second end 17 of the housing member 12 includes a cap 17a and a seal 17b. The first end 15 of the housing member 12 also includes a control rod 19. The elongated cylindrical housing member 12 includes main housing portion 20, a cone nut housing portion 22, and an overtravel housing portion 24. An elongated rod member 26 is positioned for reciprocal movement within the housing member 12 through the second end 17 of the housing member 12. The rod member 26 is restrained against rotation and pivotally connectable at a first end 28 thereof to the railway brake rigging by the rear jaw 18. The rod member has a threaded portion 30 adjacent a second end 32 that extends into the housing member 12 and through the second end 17 of the housing member 12.

Figure 3A:
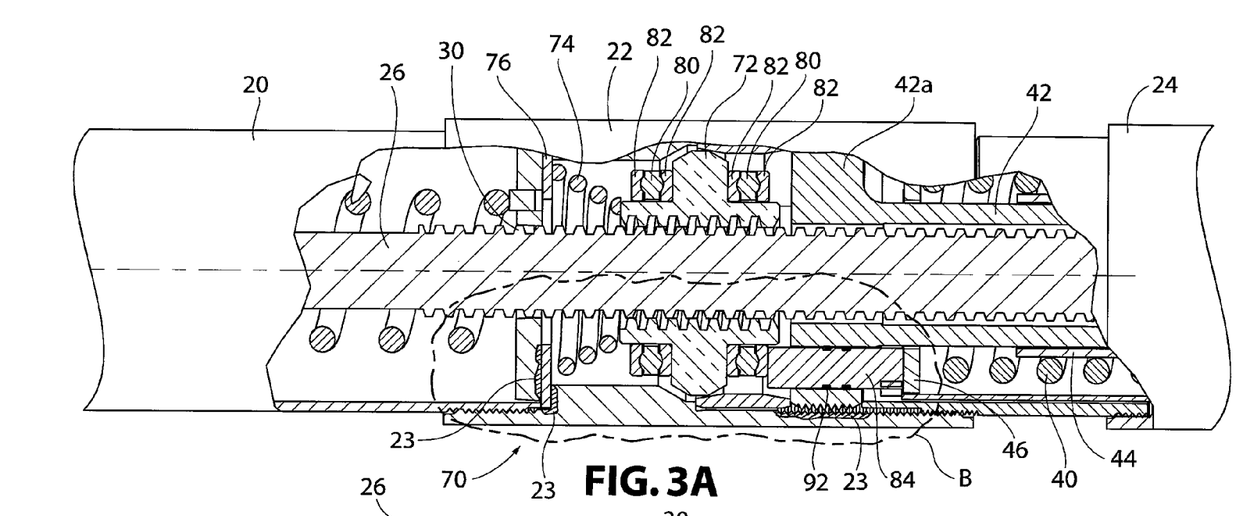
FIG. 3A is a partial cross-sectional view of the slack adjuster of FIG. 1, including the contaminant mitigation device.
Figure 3B:
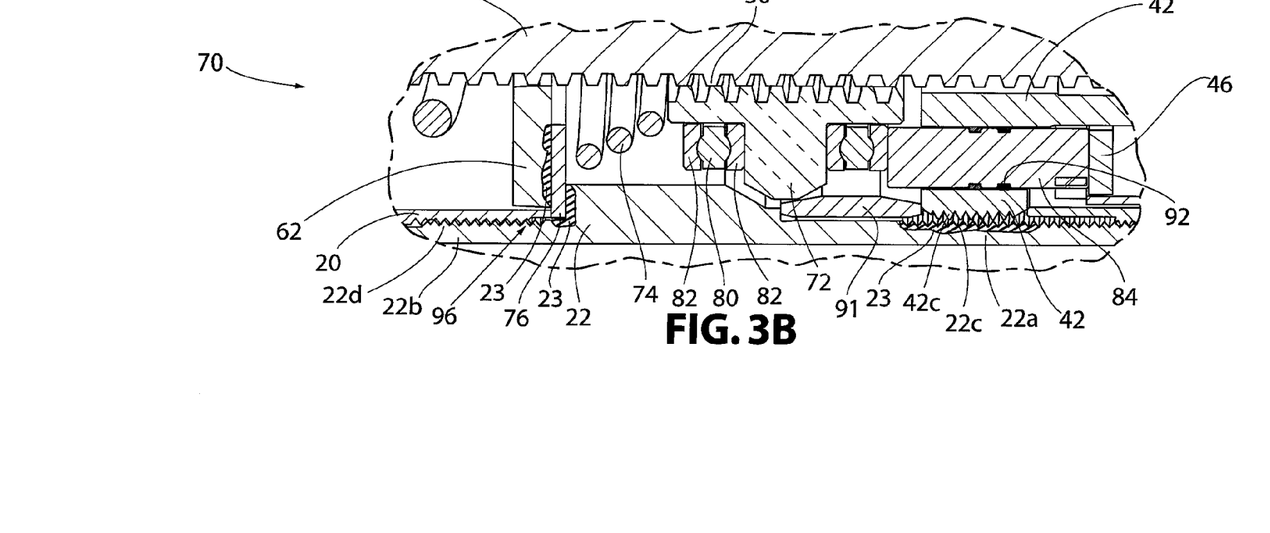
FIG. 3B is a cross-sectional view of detail B of FIG. 3A, showing the critical operating area of the slack adjuster including the contaminant mitigation device.

With continuing reference to FIGS. 1 and 2 and with reference to FIGS. 3A and 3B, the slack adjuster 10 includes a critical operating area 70 which is shown by portion "B" in FIG. 3A. This critical operating area 70 includes the components of the slack adjuster 10 which operate together to adjust the brake rigging. One example of a critical operating area is shown in FIGS. 3A and 3B and includes a positioning member, such as a cone lock nut 72 that is located within the cone nut housing portion 22 and threadedly engaged with the threaded portion 30 of the elongated rod 26. The cone lock nut 72 rotates about the threaded portion 30 of the elongated rod 26 between respective first abutting engagement, disengagement, and second abutting engagement positions to change the length of the slack adjuster 10 by changing the relative longitudinal positions between the housing member 12 and the elongated rod 26.

As shown in FIG. 2, the slack adjuster 10 also includes a first urging assembly which can include at least one main or first spring 34, an additional spring 36, located within a spring cup 38, and a conical spring 74, located within the critical operating area 70 for urging the cone lock nut 72 into a first position, such as a disengaged position, with respect to the housing member 12. The conical spring 74 can be caged between the cone lock nut 72 and a conical spring seat 76. It can be appreciated that the first and/or second springs 34, 36 can be replaced with other types of urging members, including fluid operated cylinders such as pneumatic or hydraulic cylinders.

With continuing reference to FIG. 2, a second urging assembly is also provided which, according to one embodiment, can include a second spring or overtravel spring 40 located within an overtravel spring housing 41. The overtravel spring is stronger than the first or main spring 34 so as to overcome the force applied by the first or main spring 34 and, therefore, urge the cone lock nut 72 into a second position. It can also be appreciated that, like the first urging assembly, other types of urging members, such as fluid operated cylinders may be used in place of the overtravel spring 40.

The overtravel housing portion 24 can also include a rod guide 42 threaded at a first end 42a and a second end 42b and configured for cooperating with the elongated rod 26 and overtravel spring 40. An overtravel sleeve 44 can be provided between at least a portion of the rod guide 42 and the overtravel spring 40. One or more washers 46 can be provided within the overtravel housing portion 24.

Other components located at the front end of the slack adjuster 10 includes an overtravel sliding collar 48, an overtravel control ring swaging 50, and a machined tube 52. A wiper seal 54 and a retaining ring 56 may also be provided at this front end. Prior to the present disclosure, previous slack adjuster designs relied upon this wiper seal 54 to prevent water and contaminants from entering through the front of the slack adjuster 10 and into the critical operating area 70 of the slack adjuster 10. However, in situations where the slack adjuster is exposed to a large amount of water, this wiper seal 54 may be insufficient to prevent the entrance of water and/or contaminants from entering into the critical operating area 70 and causing operational problems with the components located therein which operate together to adjust the brake rigging of the railcar. The operational problems can occur if dirt or other foreign objects become trapped between these moving components or if any accumulated water surrounding the components freezes, which would inhibit and/or otherwise prevent normal movement of the components with respect to one another.

Referring in particular to FIGS. 3A and 3B, in addition to the cone lock nut 72, conical spring 74, and conical spring seat 76, the critical operating area 70 includes bearing assemblies, generally indicated as 78 in FIG. 2, including a bearing 80 cooperating with race 82, which are located on both sides of the cone lock nut 72. Also included in the critical operating area 70 is one or more trigger pins 84 located within apertures 86 extending into the first end 42a of the rod guide 42, a retaining ring 88, an overtravel housing portion seal 90, and a front cone 91.

Figure 4:
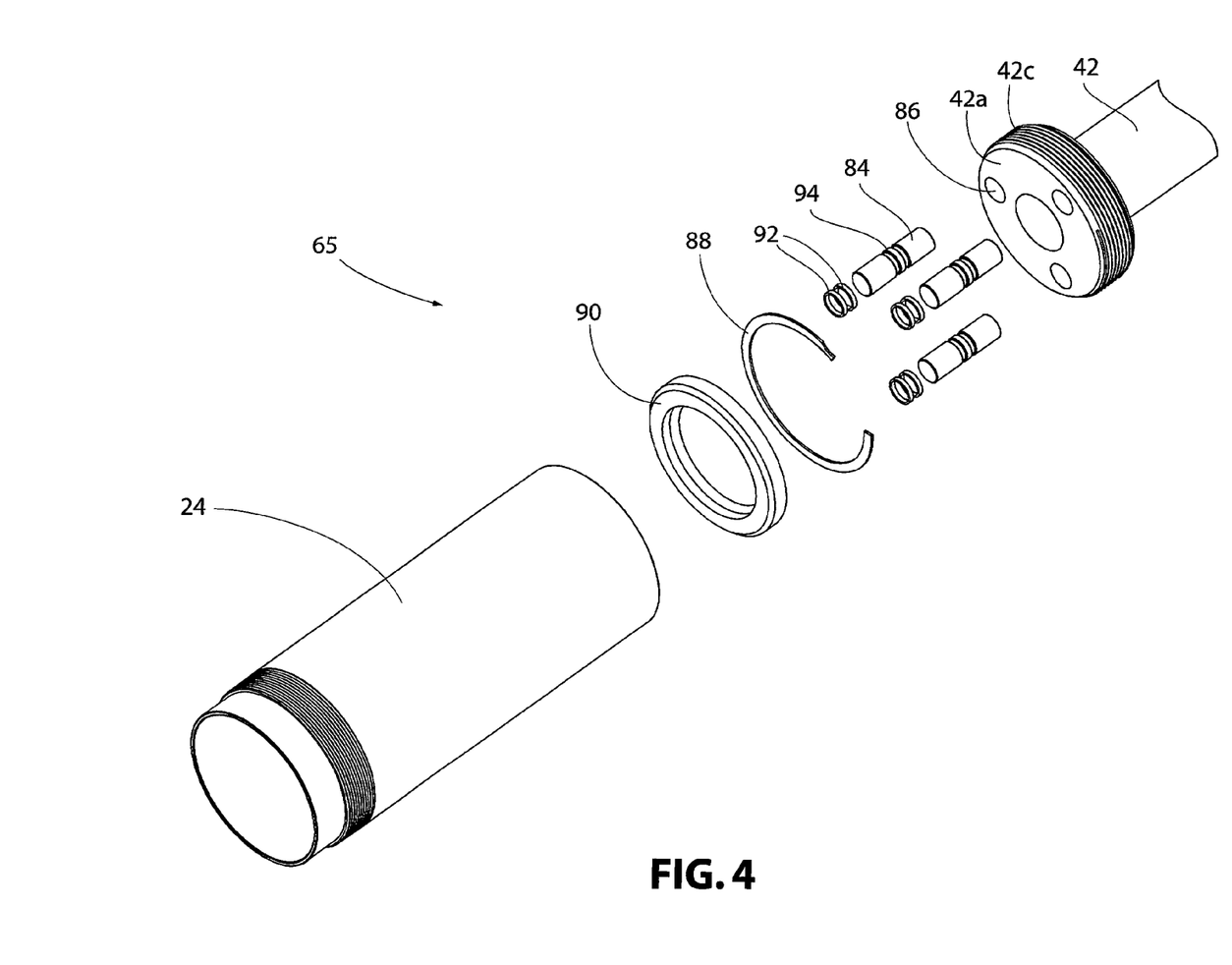
FIG. 4 is a perspective view of the contaminant mitigation device of FIG. 1.

The present disclosure is further directed to a contaminant mitigation device, generally indicated as 65 in FIG. 4 that includes a sealing system configured for cooperating with at least one of the main housing portion 20, cone nut housing portion 22, and/or the overtravel housing portion 24 to prevent and/or seal the cone nut housing portion against entrance of fluid and/or contaminants therein.

In operation, the cone lock nut 72, the bearing assemblies 78, and the conical spring 74 cooperate together to change a length of the slack adjuster 10 by changing a relative longitudinal position between the main housing portion 20 and the elongated rod 26 located within the main housing portion 20. The cone nut housing portion 22 is positioned between the overtravel housing portion 24 and the main housing portion 20. The cone nut housing portion includes a first end 22a positioned adjacent to the overtravel housing portion 24 and a second end 22b positioned adjacent to the main housing portion 20. As shown in FIG. 2, the cone nut housing portion 22 can include a retaining ring 58, a collet 60, and a washer 62. The first end 22a and the second end 22b can include threads 22c, 22d, respectively, that are configured to cooperate with threads on the main housing portion 20.

Referring in particular to FIGS. 3A, 3B, and 4, according to one embodiment, the sealing system can include a sealing member 23 configured for cooperating with at least one of the first end 22a and the second end 22b of the cone nut housing portion. According to one design, the sealing member 23 can comprise an O-ring and/or a sealing material associated with the first end 22a of the cone nut housing portion 22. It can be appreciated that the sealing members can be any known sealing members including gaskets, O-rings, rubber sealant material, adhesive sealing compound, and the like.

According to another design, the sealing member 23 can cooperate with the threads 42c located at the first end 42a of the rod guide 42 which interengage with the threads 22c located at the first end 22a of the cone nut housing portion 22. According to one design, a thread locking sealing material such as Loctite® can be positioned around the threads 42c of the rod guide 42. In this design, the sealing member 23 forms an interactive seal between the threads 42c of the rod guide and the threads 22c at the first end 22a of the cone nut housing portion to prevent fluid and/or contaminants from entering the cone nut housing portion 22 through the cooperating threads 22c, 42c.

The first end 42a of the rod guide 42 can include at least one trigger pin 84 located within an aperture 86 in the first end 42a of the rod guide 42. The slack adjuster 10 can include a plurality of trigger pins 84, each of which are located within an aperture 86 in the first end 42a of the rod guide. According to yet another design, the sealing system can include at least one O-ring 92, or multiple O-rings, as needed, associated with a body portion 94 of the at least one trigger pin 84 to prevent fluid and/or contaminants from entering the cone nut housing portion 22 through the aperture 86 in the rod guide 42. It can be appreciated that the O-ring can be formed from any well-known materials such as ethylene propylene diene monomer (EPDM), nitrile, fluoroelastomers such as Viton® or FKM (fluoroelastomers), silicone and the like.

In addition to, or alternatively to, the sealing members discussed above, the sealing system can include either an O-ring, gasket, or sealing material, generally indicated as 96 in Fib. 3B, associated with the second end 22b of the cone nut housing portion 22. According to one design, this O-ring or sealing material can cooperate with the conical spring 74 or the conical spring seat 76 such that during assembly of the main housing portion 20 to the cone nut housing portion 22, the sealing material becomes compressed and/or flattened to activate in this area and to seal the second end 22b of the cone nut housing portion 22 against the entrance of fluid and/or contaminants. This rubber gasket/O-ring or sealing material on the conical spring seat 76 can be used in any of these locations as long as it is dimensioned correctly.

Figure 3C:
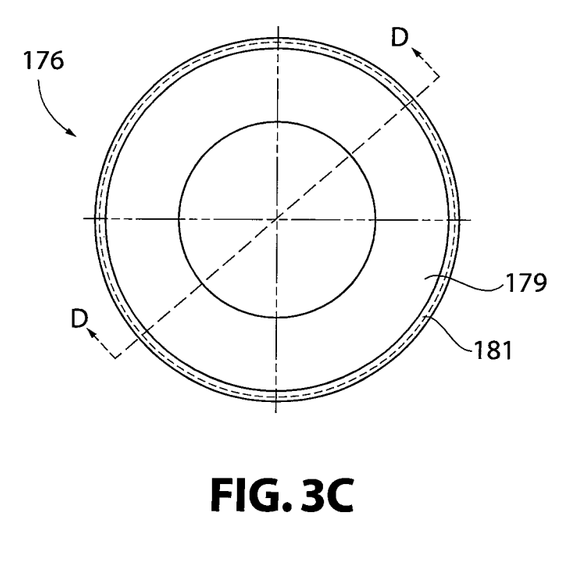
FIG. 3C is a front elevation view of a rubberized washer/spring seat according to one embodiment which can be used with the contaminant mitigation device of FIG. 3A.
Figure 3D:
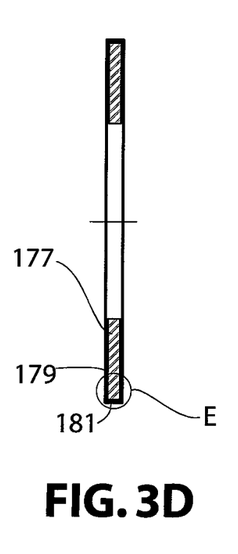
FIG. 3D is a cross-sectional side view of the rubberized washer/spring seat taken along line D-D of FIG. 3C.
Figure 3E:
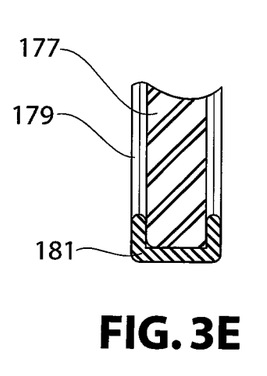
FIG. 3E is a cross-sectional view of detail E of FIG. 3D.

According to one embodiment, as shown in FIGS. 3C-3E, the conical spring seat 176 can comprise a rubberized washer having a metal core 177 covered by a sealing material 179. The sealing material 179 can be any known rubber material. One example of sealing material is Nitrile rubber. As shown in FIG. 3D, the sealing material can fully enclose the core 177. The edge portion 181 of the conical spring seat 176 also includes the sealing material 179 and when the conical spring seat 176 is positioned in the slack adjuster 10, this edge portion 181 is located at the intersection between the conical spring seat 176 and the cone nut housing portion 22.

Figure 5:
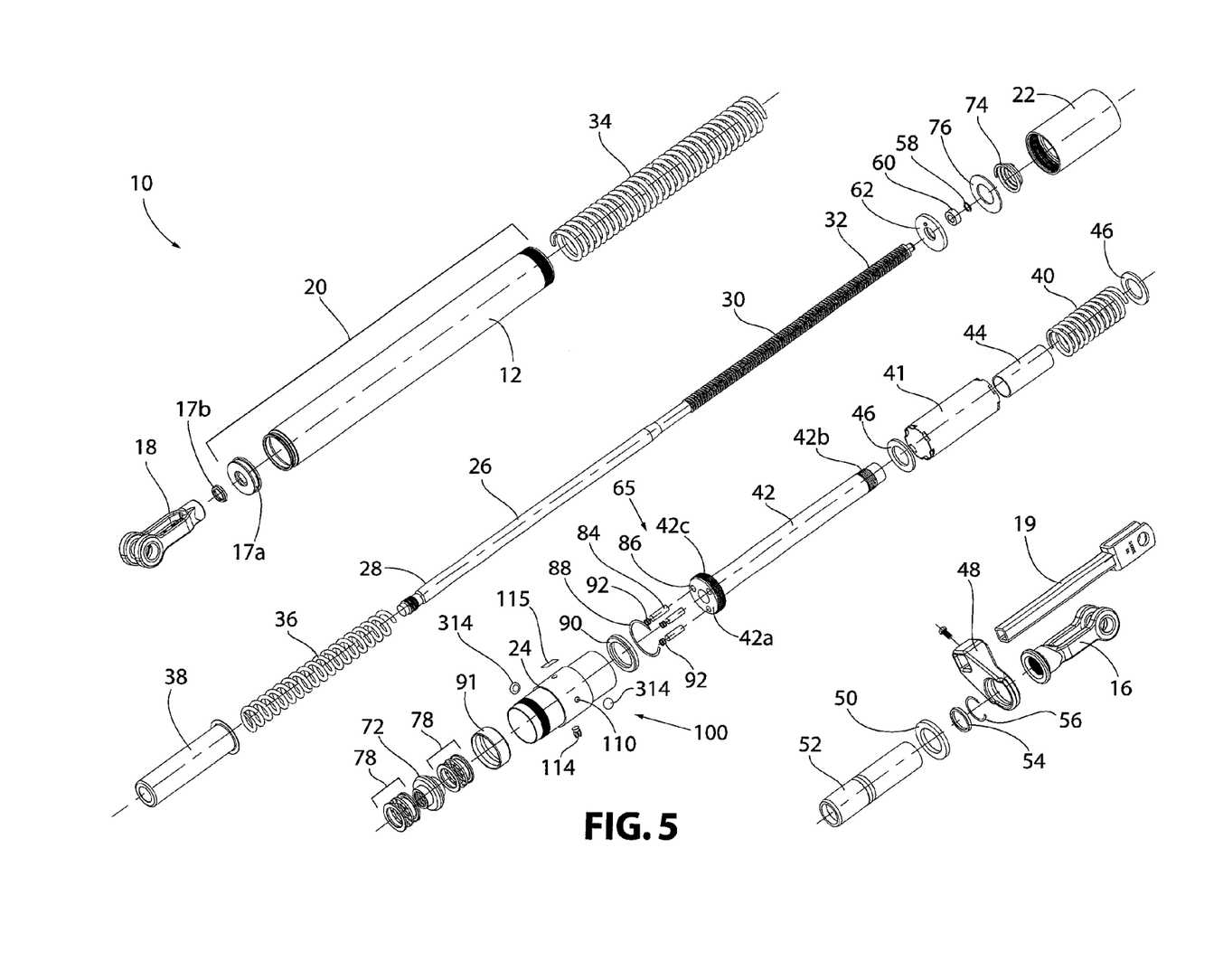
FIG. 5 is an expanded, perspective view of a slack adjuster, including the contaminant mitigation device of FIG. 1 in accordance with another embodiment.

Reference is now made to FIG. 5 which shows an expanded perspective view of a slack adjuster 10, including the contaminant mitigation device 65 in accordance with another embodiment. In this arrangement, the overtravel housing portion 24 can include a drainage system, generally indicated as 100, having one or more apertures 110 extending through a sidewall portion of the overtravel housing portion 24. These apertures 110 can be used in combination with the sealing system described in detail above to provide a drainage outlet for any fluid and/or contaminants that accumulate within the overtravel portion 24. The apertures 110 can include plugs or one-way valves 114 or rounded, low-profile button-shaped plugs 314 located therein. Alternatively, patches 115 covering the apertures 110 may be provided, which can be removed as needed to enable drainage of the fluids and/or contaminants from the overtravel housing portion 24. The use of the rounded, low-profile button-shaped plug 314 has several advantages, especially in terms of stacking, packaging, and shipping, as the rounded, low-profile shape enables the slack adjusters 10 to be easily stacked on one another, as there is less chance of the plugs 314 being damaged or broken off, as the top surface of the button-shaped plug 314 has a low-profile that rests close to the exterior surface of the sidewall portion of the overtravel portion 24.

Figure 6A:
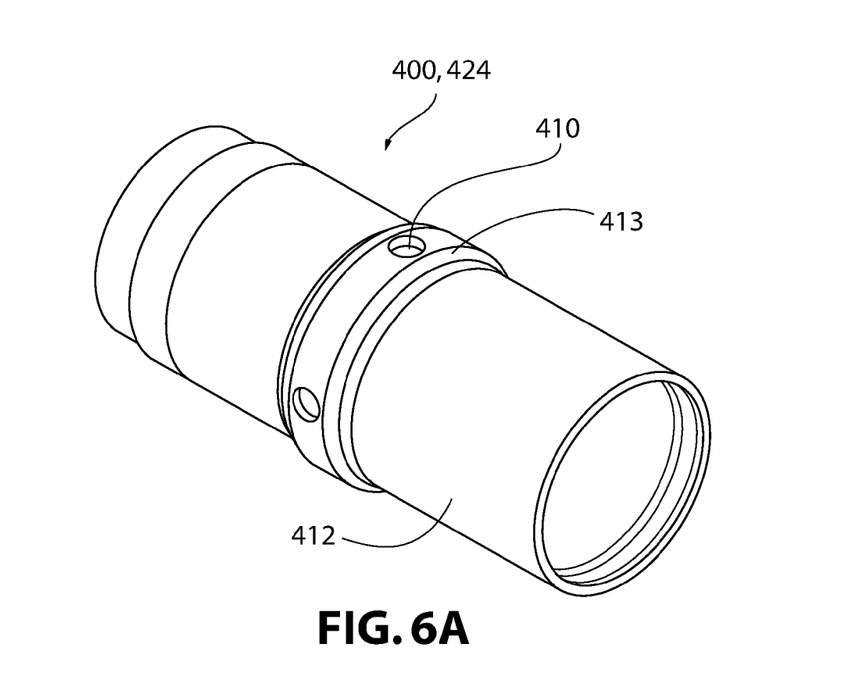
FIG. 6A is a perspective view of a drainage system including a one-piece overtravel housing member, which can be used in the contaminant mitigation device of FIG. 3B in accordance with another embodiment.
Figure 6B:
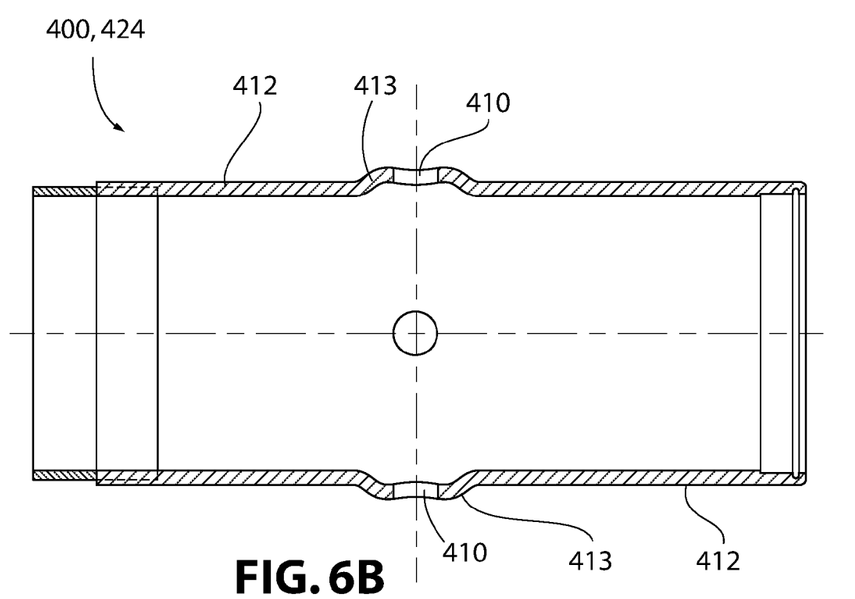
FIG. 6B is a cross-sectional side view of the drainage system of FIG. 6A.

Reference is now made to FIGS. 6A-6B which show a drainage system, generally indicated as 400, according to another embodiment of the invention. In this embodiment, the overtravel housing portion 424 can be a one-piece member. The overtravel housing portion 424 includes at least one aperture 410 extending through a sidewall portion 412 thereof. The aperture 410 is configured to form a direct egress for any accumulated fluids or contaminants with the overtravel housing portion 424. Multiple apertures 410 can be located about, and extending through the sidewall portion 412 of the overtravel housing portion 424. According to the embodiment shown in FIGS. 6A and 6B, a portion 413 of the sidewall portion 412, which includes apertures 410, can have a greater diameter or extend beyond the plane of the remaining sidewall portion 412. It can be appreciated that any of the plugs or one-way valves 114, rounded, low-profile plugs 314, and/or patches 115 can be provided for sealingly engaging one or more of the apertures 410. The plugs 114, 314, and/or patches 115 can be removed as needed to enable drainage of the fluids and/or contaminants from the overtravel housing portion.

With continuing reference to FIGS. 1-5, a method is provided for sealing a critical operating area 70, which is shown by portion "B" in FIG. 3A of a slack adjuster 10 for a railway vehicle for a railway brake rigging. The slack adjuster 10 includes a main housing portion 20, a cone nut housing portion 22 enclosing the critical operating area 70 of the slack adjuster 10, and an overtravel housing portion 24. The method includes providing a sealing system configured to cooperate with at least one of the main housing portion 20, the cone nut housing portion 22, and the overtravel housing portion 24 to seal the critical operating area 70 against entrance of fluid and/or contaminants therein or to at least reduce the exposure of this area to fluid and/or contaminants. The method of providing the sealing system can include at least one of positioning a sealing member between a threaded engagement between the rod guide 42 and the first end 22a of the cone nut housing portion 22, associating at least one sealing member with each of a trigger pin 84 positioned within the rod guide 42, and/or associating a sealing member, generally indicated as 96, with a conical spring 74 or conical spring seat member 76 located at the second end 24b of the cone nut housing portion 22. The method can also include providing at least one aperture 110 through a sidewall portion of at least the main housing portion 20, the cone nut housing portion 22, and the overtravel housing portion 24 to enable drainage of fluid and/or contaminants. A removable plug, one-way valve 114, or a removable patch 115 can be provided in or on the at least one aperture.

It can be appreciated that any of the sealing systems described above can be used alone or cumulatively in any combination to achieve the necessary sealing of the slack adjuster assembly 10 so as to protect the critical operating area 70 from fluid and/or contaminants. It can also be appreciated that the containment mitigation device 65 can include sealing systems using sealing members located at other locations along the housing member 12 of the slack adjuster 10, such as in cooperation with the main housing portion 20 and/or the overtravel housing portion 24 as long as these sealing members prevent the entrance of fluids and/or contaminants from entering into the critical operating area 70 of the slack adjuster 10.

While the present invention is satisfied by embodiments in many different forms, there is shown in the drawings and described herein in detail the preferred embodiments of the invention, with the understanding that the present disclosure is to be considered as exemplary of the principles of the invention and is not intended to limit the invention to the embodiments illustrated. Various other embodiments will be apparent to and readily made by those skilled in the art without departing from the scope and spirit of the invention.

The scope of the invention will be measured by the appended claims and their equivalents.

What is claimed is:

1. A contaminant mitigation device for use with a slack adjuster for a railway brake rigging, said slack adjuster including a main housing portion, a cone nut housing portion enclosing a critical operating area of the slack adjuster, a rod guide associated with the cone nut housing portion, and an overtravel housing portion, said contaminant mitigation device comprising a sealing system for sealing the critical operating area against entrance of fluid and/or contaminants therein or to reduce exposure of the critical operating area to fluid and/or contaminants wherein the sealing system includes at least one of:
   (a) a sealing member positioned between a threaded engagement between the rod guide and an end of the cone nut housing portion;
   (b) at least one sealing member associated with each of a trigger pin positioned within the rod guide; and
   (c) a sealing member associated with a conical spring or conical spring seat member located at an end of the cone nut housing portion.

2. The device of claim 1, wherein the critical operating area includes components configured to operate together to adjust the brake rigging.

3. The device of claim 2, wherein the components of the critical operating area includes a cone lock nut, at least one bearing race assembly, and a conical spring, all of which are configured to cooperate together to change a length of the slack adjuster by changing a relative longitudinal position between the main housing portion and a rod member located within the main housing portion.

4. A contaminant mitigation device for use with a slack adjuster for a railway brake rigging, said slack adjuster including a main housing portion, a cone nut housing portion enclosing a critical operating area of the slack adjuster, and an overtravel housing portion, said contaminant mitigation device comprising a sealing system for sealing the critical operating area against entrance of fluid and/or contaminants therein or to reduce exposure of the critical operating area to fluid and/or contaminants, wherein the cone nut housing portion is positioned between the overtravel housing portion and the main housing portion, and
   wherein the cone nut housing portion includes a first end positioned adjacent to the overtravel housing portion and a second end positioned adjacent to the main housing portion, and
   wherein the sealing system includes a sealing member configured for cooperating with at least one of the first and second ends of the cone nut housing portion.

5. The device of claim 4, wherein the sealing member comprises at least one of an O-ring and sealing material associated with the first end of the cone nut housing portion.

6. The device of claim 1, wherein the rod guide includes threads configured for cooperating with threads located at a first end of the cone nut housing portion, and
   wherein the sealing member forms an interactive seal between the threads of the rod guide and the threads of the cone nut housing portion preventing fluid and/or contaminants from entering the cone nut housing portion through the cooperating threads.

7. The device of claim 1, wherein the slack adjuster includes at least one trigger pin located within an aperture in the rod guide, at least a portion of the rod guide and the trigger pin being associated with the first end of the cone nut housing portion, and
wherein the sealing system includes at least one O-ring associated with the at least one trigger pin to prevent fluid and/or contaminants from entering the cone nut housing portion through the aperture in the rod guide.

8. The device of claim 4, wherein the sealing member comprises at least one of an O-ring and sealing material associated with the second end of the cone nut housing portion.

9. The device of claim 8 wherein the slack adjuster includes a conical spring and a conical spring seat associated with the second end of the cone nut housing portion and the sealing member cooperates with the conical spring or the conical spring seat such that during assembly of the main housing portion to the cone nut housing portion, the sealing material becomes compressed to seal the second end of the cone nut housing portion against the entrance of fluid and/or contaminants.

10. The device of claim 8, wherein the slack adjuster includes a rubberized conical spring seat associated with the second end of the cone nut housing portion, and wherein the sealing member comprises the rubberized conical spring seat.

11. The device of claim 1, wherein the cone nut housing portion is positioned between the overtravel housing portion and the main housing portion and wherein the cone nut housing portion includes a first end and a second end, wherein the first end of the cone nut housing portion is positioned adjacent to the overtravel housing portion and a second end of the cone nut housing portion is positioned adjacent to the main housing portion, and
   wherein the sealing system includes:
      (a) a sealing member positioned between the threaded engagement between the rod guide and the first end of the cone nut housing portion;
      (b) at least one sealing member associated with each of the trigger pins positioned within the rod guide; and
      (c) a sealing member associated with the conical spring or conical spring seat member located at the second end of the cone nut housing portion.

12. The device of claim 1, wherein the sealing system comprises sealing members located at a first end and a second end of the cone nut housing portion, and
   wherein the sealing members are selected from the group consisting of gaskets, O-rings, rubber sealant material, and adhesive sealing compound.

13. The device of claim 1, wherein the overtravel housing includes a drainage system for draining any fluid and/or contaminants that accumulate within the overtravel housing.

14. The device of claim 13, wherein the drainage system includes at least one aperture extending through a sidewall portion of the overtravel housing.

15. The device of claim 14, wherein the aperture includes at least one of a removable plug, a one-way valve, a low-profile button-shaped plug, and a removable patch for plugging or covering the aperture, and wherein the at least one plug and the patch are configured for removal from the aperture to enable drainage of the fluids and/or contaminants from the overtravel housing.

16. A double-acting tension actuatable slack adjuster to adjust the slack in a railway vehicle brake linkage, said slack adjuster comprising:
   (a) an elongated hollow cylindrical housing member which is restrained against rotation and pivotally connectable at a first end thereof, said elongated hollow cylindrical housing including a main housing portion, a cone nut housing portion, and an overtravel housing portion;

(b) an elongated rod member which is restrained against rotation and pivotally connectable at a first end thereof, said rod member having at least a portion thereof threaded, said threaded portion of said rod member extending into said housing member through a second end of said housing member;

(c) a cone lock nut threadedly engaged with said threaded portion of said rod member intermediate a first and second end thereof, said cone lock nut axially movable for rotating about said threaded portion of said rod member to change the length of said slack adjuster by changing the relative longitudinal position between said housing member and said rod member, said cone lock nut being located within the cone nut housing portion;

(d) at least a first spring for urging said cone lock nut into a first position with respect to said housing member;

(e) a second spring for overcoming a force applied by said first spring and for urging said cone lock nut into a second position; and (f) a sealing system configured for cooperating with at least one of the main housing portion, cone nut housing portion, and overtravel housing portion to seal the cone nut housing portion against entrance of fluid and/or contaminants therein, wherein the sealing system includes at least one of:
(a) a sealing member positioned between a threaded engagement between the rod guide and the first end of the cone nut housing portion;
(b) at least one sealing member associated with each of a trigger pin positioned within the rod guide;
(c) a sealing member associated with a conical spring or conical spring seat member located at the second end of the cone nut housing portion; and
(d) a sealing member configured for cooperating with at least one end of the cone nut housing portion.

17. The slack adjuster of claim 16, wherein the sealing system comprises at least one of:
(a) a sealing member positioned between a threaded engagement between the rod guide and the first end of the cone nut housing portion;
(b) at least one sealing member associated with each of a trigger pin positioned within the rod guide; and
(c) a sealing member associated with a conical spring or conical spring seat member located at the second end of the cone nut housing portion.

18. The slack adjuster of claim 16, including a drainage system configured for cooperation with said elongated hollow cylindrical housing.

19. A slack adjuster for a railway brake rigging, said slack adjuster including a main housing portion, a cone nut housing portion enclosing a critical operating area of the slack adjuster, and an overtravel housing portion,
wherein the cone nut housing portion is positioned between the overtravel housing portion and the main housing portion, and
wherein the cone nut housing portion includes a first end positioned adjacent to the overtravel housing portion and a second end positioned adjacent to the main housing portion, the slack adjuster including a sealing system configured for reducing or preventing the critical operating area from contact with fluids and/or contaminants, and wherein the sealing system includes at least one of:
(a) a sealing member positioned between a threaded engagement between the rod guide and the first end of the cone nut housing portion;
(b) at least one sealing member associated with each of a trigger pin positioned within the rod guide; and
(c) a sealing member associated with a conical spring or conical spring seat member located at the second end of the cone nut housing portion.

20. The slack adjuster of claim 19, including a drainage system configured for cooperation with at least one of the main housing portion, cone nut housing portion, and overtravel housing portion.

21. A method of sealing a critical operating area of a slack adjuster for a railway vehicle for a railway brake rigging, said slack adjuster including a main housing portion, a cone nut housing portion enclosing a critical operating area of the slack adjuster, a rod guide associated with the cone nut housing portion, and an overtravel housing portion, said method comprising providing a sealing system for sealing the critical operating area against entrance of fluid and/or contaminants therein or to reduce the exposure of the critical operating area to fluid and/or contaminants, wherein the sealing system includes at least one of:
(a) a sealing member positioned between a threaded engagement between the rod guide and an end of the cone nut housing portion;
(b) at least one sealing member associated with each of a trigger pin positioned within the rod guide;
(c) a sealing member associated with a conical spring or conical spring seat member located at an end of the cone nut housing portion; and
(d) a sealing member configured for cooperating with at least one end of the cone nut housing portion.

22. The method of claim 21, wherein providing the sealing system comprises at least one of:
(a) positioning a sealing member between a threaded engagement between the rod guide and the first end of the cone nut housing portion;
(b) associating at least one sealing member with each of a trigger pin positioned within the rod guide; and
(c) associating a sealing member with a conical spring or conical spring seat member located at the second end of the cone nut housing portion.

23. The method of claim 21, including providing at least one aperture through a sidewall portion of the overtravel housing portion to enable drainage of fluid and/or contaminants.

24. The method of claim 23, including providing within or on the at least one aperture, a removable plug, a low-profile button-shaped plug, a one-way valve, or a removable patch.

* * * * *